United States Patent
Cooke

(10) Patent No.: US 12,324,428 B2
(45) Date of Patent: *Jun. 10, 2025

(54) SONIC DEVICE AND METHOD FOR REPELLING MOSQUITOES

(71) Applicant: Laurence H. Cooke, Los Gatos, CA (US)

(72) Inventor: Laurence H. Cooke, Los Gatos, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 18/106,736

(22) Filed: Feb. 7, 2023

(65) Prior Publication Data
US 2023/0180738 A1 Jun. 15, 2023

Related U.S. Application Data

(63) Continuation-in-part of application No. 17/076,415, filed on Oct. 21, 2020, now Pat. No. 11,574,620.

(51) Int. Cl.
| | |
|---|---|
| *A01M 29/16* | (2011.01) |
| *G06F 3/16* | (2006.01) |
| *H04R 5/02* | (2006.01) |
| *H04R 17/00* | (2006.01) |
| *H04S 1/00* | (2006.01) |

(52) U.S. Cl.
CPC ............ *A01M 29/16* (2013.01); *G06F 3/165* (2013.01); *H04R 5/02* (2013.01); *H04R 17/00* (2013.01); *H04S 1/007* (2013.01)

(58) Field of Classification Search
CPC .......... G10K 15/04; G10K 15/02; G06F 3/16
USPC ............................................. 381/2
See application file for complete search history.

(56) References Cited

U.S. PATENT DOCUMENTS

| | | |
|---|---|---|
| 5,136,477 A | 8/1992 | Lemmey |
| 7,109,849 B2 | 9/2006 | Caine |
| 7,256,339 B1 | 8/2007 | Carmichael |
| 10,306,894 B1 | 6/2019 | Valzano et al. |
| 10,681,903 B2 | 6/2020 | Eom |
| 2002/0005437 A1 | 1/2002 | Ketcha et al. |
| 2002/0121045 A1 | 9/2002 | Hall |
| 2004/0216353 A1 | 11/2004 | Caine |
| 2008/0146287 A1 | 6/2008 | Zhu et al. |
| 2014/0334268 A1 | 11/2014 | O'Hara |
| 2017/0010664 A1 | 1/2017 | Tanaka et al. |
| 2020/0138004 A1 | 5/2020 | Sandford et al. |

OTHER PUBLICATIONS

Electronic Mosquito Repellent Device Anti Mosquito, View Anti Mosquito, Soaring Product Details from Nigbo Jianbei Soaring Plastic, 2009.

(Continued)

*Primary Examiner* — Vivian C Chin
*Assistant Examiner* — Douglas J Suthers
(74) *Attorney, Agent, or Firm* — Panitch Schwarze Belisario & Nadel LLP

(57) ABSTRACT

Methods and devices for repelling mosquitoes may operate by generating the beats of fore and hind pairs of dragonfly wings, which may be dragonfly wing beats in the form of pressure waves. Such beats may be generated using digital or analog circuitry. The digital beats may be recordings of synthesized or enhanced beats of dragonfly wings beating. The device may take the form of a button that may be worn or otherwise carried by a user.

11 Claims, 7 Drawing Sheets

(56) References Cited

OTHER PUBLICATIONS

Ultrasonic Mosquito Repeller—Portable Insects Pest Control Repellent-Non-Chemical Sound Waves—Child & Pet Safe—w/Dragonfly Mode + LED Flashlight & Alarm for Emergency—For Outdoor & Indoor Use.

Li et al., "Experimental and Numerical Investigation on Dragonfly Wing and Body Motion during Voluntary Take-off", Scientific Reports, 8:1011, 16 pages, 2018.

Genoud et al., Optical remote sensing for monitoring flying mosquitoes, gender identification and discussion on species identification, Applied Physics B, 124:46, 2018.

Arthur et al., "Mosquito (*Aedes aegypti*) flight tones: Frequency, harmonicity, spherical spreading, and phase relationships", J. Acoust. Soc. Am. 135(2), Feb. 2014.

Wang et al., "Measuring wing kinematics, flight trajectory and body attitude during forward flight and turning maneuvers in dragonflies", The Journal of Experimental Biology, 206, pp. 745-757, 2002.

Wakeling et al., "I. Gliding Flight and Steady-State Aerodynamic Forces", The Journal of Experimental Biology 200, pp. 543-556, 1996.

TESS Record Dragonfly Mosquito Repellent, accessed Sep. 2, 2020.

Invitation to Pay Additional Fees and Where Applicable Protest Fee issued Dec. 9, 2021 in Int'l Application No. PCT/US2021/055416.

Radarcan Website (https://eu.radarcan.com, website downloaded from archive.org dated Sep. 25, 2020 with additional pages from Mar. 5, 2021 to show pictures that would not print from 2020.

Int'l Search Report and Written Opinion issued Feb. 14, 2022 in Int'l Application No. PCT/US2021/055416.

Usherwood et al., "Phasing of dragonfly wings can improve aerodynamic efficiency by removing swirl", Journal of the Royal Society Interface, May 13, 2008.

Notice of Allowance issued Oct. 5, 2022 in U.S. Appl. No. 17/076,415.
Office Action issued May 24, 2022 in U.S. Appl. No. 17/076,415.
Office Action issued Dec. 22, 2021 in U.S. Appl. No. 17/076,415.

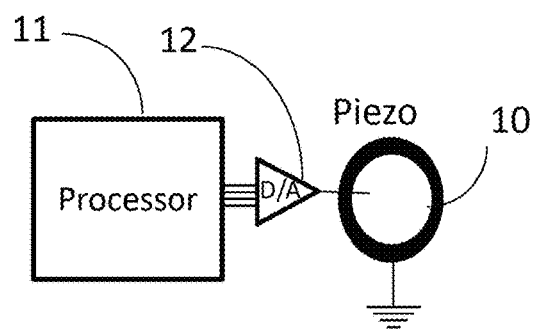 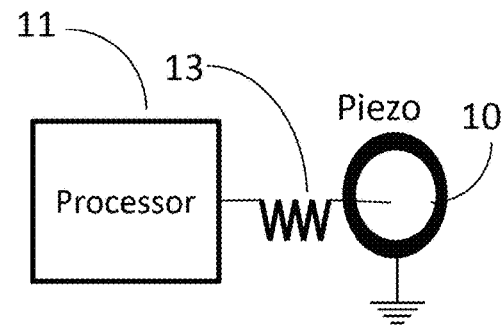
Figure 1a                    Figure 1b

SONIC DEVICE AND METHOD FOR REPELLING MOSQUITOES

CROSS-REFERENCE TO RELATED APPLICATION

This application is a continuation-in-part of U.S. patent application Ser. No. 17/076,415, filed Oct. 21, 2020, which is incorporated herein by reference.

FIELD OF THE INVENTION

Aspects of the present disclosure may relate to a simple device that emits sound in the form of pressure waves like a pair of dragonfly's wings beating, as well as to a related method of repelling mosquitoes.

BACKGROUND OF THE INVENTION

It is a well-known fact that female mosquitoes bite people, and can transmit diseases such as malaria, Zika virus, West Nile virus, chikungunya virus, and dengue fever. For this reason, the most common forms of protection against being bitten by a mosquito are devices which attract and kill mosquitoes, or sprays which chemically repel mosquitoes. Such inventions may be exemplified by Eom in U.S. Pat. No. 10,681,903, granted Jun. 16, 2020, or Valzano et al. in U.S. Pat. No. 10,306,894, granted Jun. 4, 2019.

While mosquitoes have been around for over 100 million years, dragonflies, a major predator of mosquitoes, have been around for over 300 million years. In the course of evolution, species of animals or insects have evolved to avoid predators. Darwin's "survival of the fittest" premise in his "On the Origin of Species" is the most verified and celebrated theory in science. We know from Darwin that species will thrive by increasing the likelihood of procreating and decreasing the likelihood of being killed before procreating. By extrapolation, mosquitoes increase their survival by reducing the likelihood of being killed by predators, such as dragonflies. Therefore, it may be desirable to implement alternatives to the above-noted traditional techniques for addressing mosquitoes, which may be based on such evolutionary principles.

SUMMARY OF ASPECTS OF THE DISCLOSURE

Various aspects of the present disclosure may relate to generating facsimiles of the beats of the pairs of dragonfly wings, in the form of pressure waves, including at varying levels of strength.

In one aspect, the pressure waves may be generated by creating an abstracted recording of actual dragonfly wing beats. The recording may be an amplification of the original wing beat vibrations. The recording may be in stereo. The modifications may include the form of editing extraneous noise and/or amplification of the vibrations of dragonfly wing beats. Modifications may also include extracting single dragonfly beats from the recordings, and/or replicating the extracted beats. The pressure waves may be modified to sharpen their wing physical pressure characteristics.

In another aspect the recorded beats may be synthesized from a set of parameters such as beat frequencies, volume variations and phase relationships of the frequencies. Furthermore, the application in a computer or cell phone may directly generate the synthesized dragonfly beats from the set of parameters.

In another aspect, the beats may be generated by a simple set of digitized or PCM data from a non-volatile memory that may be applied to a piezoelectric speaker.

In yet another aspect, the signals may be generated by a combination of, e.g., two digital or analog ring oscillators, whose outputs may be fed into one or more piezoelectric speakers. The ring oscillators may be designed to produce clipped and amplified sine waves with a non-zero phase offset, to simulate the pressure pulses of a pair of dragonfly wings. In one such combination the waves may have similar frequencies in the 20 to 30 Hz range, with a phase offset of approximately 110 degrees between them.

In yet another aspect, the volume of the signals may be modulated to simulate movement toward and away from the device by increasing and decreasing the amplitude of the pressure beats.

In another aspect, multiple pairs of ring oscillators may be employed to simulate multiple dragonflies.

In another aspect, the number of dragonfly beats may be varied, for example, by rotating a dial. The dial may be connected either to a potentiometer or to a digital output, which may read by the electronics to vary the number of pairs of frequencies.

In another aspect, the device may have an on/off button and a removable or fixed built-in battery, and may have a pin, button hole knob, or strap to be worn on or around an article of clothing. Alternatively, the device may fit within an article of clothing.

In another aspect, the device may have an on/off switch that may be controlled by a loud sharp sound, word or whistle.

In another aspect, the device may have a small LED light, which may be turned on or off by toggling an on/off button.

In another aspect, a low-cost version may be printed on paper as interconnects between thin film devices.

In another aspect, a microphone may be employed to turn on the speaker or speakers when mosquitoes are present. Alternatively, the microphone may be employed to determine the number of mosquitoes, which may be used to determine the number of pairs of frequencies to generate.

BRIEF DESCRIPTION OF THE DRAWINGS

Various aspects of the disclosure will now be described in connection with the attached drawings, in which:

FIGS. 1a and 1b are diagrams of examples of processors used for synthesizing or replaying a recording of the beating wings of one or more dragonflies. The recordings may be stored in memory within the processor 11 or generated by the processor.

DETAILED DESCRIPTION OF VARIOUS ASPECTS OF THE DISCLOSURE

Figure 2A:
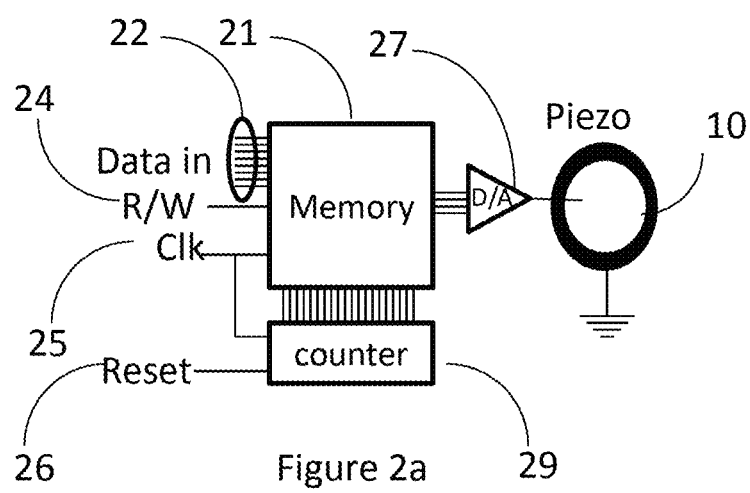
FIGS. 2a and 2b are diagrams of examples of devices for replaying versions of dragonfly wing beat pressure waves originating from encoded or recorded data in a memory.

Aspects of the present disclosure are now described with reference to FIGS. 1-6, it being appreciated that the figures may illustrate the subject matter of various particular aspects and may not be to scale or to measure.

It is known that that male and female mosquitoes have different wing beating frequencies, as described in "Optical remote sensing for monitoring flying mosquitoes, gender identification and discussion on species identification," by Adrien P. Genoud, Roman Basistyy, Gregory M. Williams & Benjamin P. Thomas in *Applied Physics B*, volume 124, Article number: 46 (2018). "Mosquito (*IAedes aegypti*) flight tones: Frequency, harmonicity, spherical spreading, and phase relationships," by Benjamin J. Arthur et al., in *J. Acoust. Soc. Am.*, 135(2), pp. 933-941, February 2014, which may be found at www.ncbi.nlm.nih.gov/pmc/articles/PMC3985972/, describes how the mosquito is sensitive to its mate's wing beating frequency, because the males normally have a wing beating frequency of around 600 Hz and the females normally have a wing beating frequency of around 400 Hz, but their wing beating frequencies converge on a common frequency when mating. This suggests that not only can the mosquitoes detect the wing beating frequency of their opposite sex, but they can also detect and modify their wing beating frequencies when they converge. Therefore, it is not unreasonable for the mosquitoes to detect the wing beating frequencies of their oldest predator, the dragonfly, and will likely attempt to fly away from such beats.

Furthermore, Caine, in U.S. Pat. No. 7,109,849, granted Sep. 19, 2006, suggests applying a sound equivalent to a dragonfly's wing beating frequency to repel mosquitoes. On the other hand, Qiushi Li, Mengzong Zheng, Tianyu Pan & Guanting Su describe, in "Experimental and Numerical Investigation on Dragonfly Wing and Body Motion during Voluntary Take-off," from www.nature.com/scientificreports/(2018) 8:10111 DOI:10.1038/s41598-018-19237-w, how during normal flight (i.e., once the dragonfly is and remains airborne, as opposed to during taking off or landing), dragonflies beat their fore and hind wings at ~20 Hz-30 Hz, with ~110° offset between the pairs of wings (i.e., fore wings and hind wings), versus higher frequencies when taking off; hence, the sound to repel mosquitoes may be the beating frequency of the pair of dragonfly wings.

High level diagrams of aspects of the present disclosure are shown in FIGS. 1*a* and 1*b*. In each of these cases, a processor 11 may output digital values to a piezo-electric speaker 10. In FIG. 1*a*, the digital output may be converted by a digital-to-analog (D/A) converter 12 into analog signals for driving the piezo-electric speaker 10, which is designed to produce pressure waves based on the analog signals. It has also been observed that when dragonflies swarm over a swarm of mosquitoes, the mosquitoes tend to react only after the dragonfly swarm is within a few feet of the mosquitoes. This implies that the pressure waves from the wing beats provide sufficient additional directionality, thereby causing the mosquitoes to evade the dragonflies.

In FIG. 1*b*, a single pulsed digital output may be adjusted by a series resistor 13 into the intrinsic capacitance of the piezo-electric speaker 10 to control the vibrational pressure waves or dragonfly beats. The digital values may be real or modified recordings of real dragonflies. The modifications may include editing extraneous noise and/or amplification of the dragonfly beats or extracting single dragonfly beats from recordings of multiple dragonflies, and/or replicating the extracted beats. Alternatively, the recorded beats may be synthesized from a set of parameters such as wing beating frequencies, volume variations and/or phase relationships of the frequencies. Furthermore, the processor may reside in a computer or cell phone, and the generation of the synthesized dragonfly beats from the set of parameters may occur by executing an application on the processor. In addition, the parameters may include volume variation of the dragonfly wing beating frequencies, or the number of dragonflies, and their volume and/or phase relationships to each other.

A high-level schematic of another aspect of the present disclosure is shown in FIG. 2*a*.

The device may store and play back the wing beats of one or more dragonflies, for use in repelling mosquitoes. It may include a piezoelectric speaker 10, which may be driven by a digital-to-analog (D/A) converter 27 The D/A converter may be fed by contents from a memory 21, which may be addressed by a counter 29 that may provide a count output that may be used to cycle through locations in the memory 21, using a clock 25, after being reset 26. Note that if the reset is omitted, the counter may begin at any state, but the memory may contain complete wing beating cycles to allow for continuous operation when cycling around through the memory. The read/write control 24 may have two states: read, for generating the dragonfly beats out of the piezoelectric speaker 10, and write, for loading the memory via digital inputs placed on the Data In lines 22. The digital data on the Data In lines 22 may correspond to samples of the analog values of the dragonfly beats captured at the frequency used to step through the memory 21 with the counter 29, and not lower than the Nyquist frequency for the dragonfly beats. According to a further aspect, the number of inputs to the D/A converter 27 may be limited to use the digital data in the memory 21, which may be pulse code modulated (PCM).

Figure 2B:
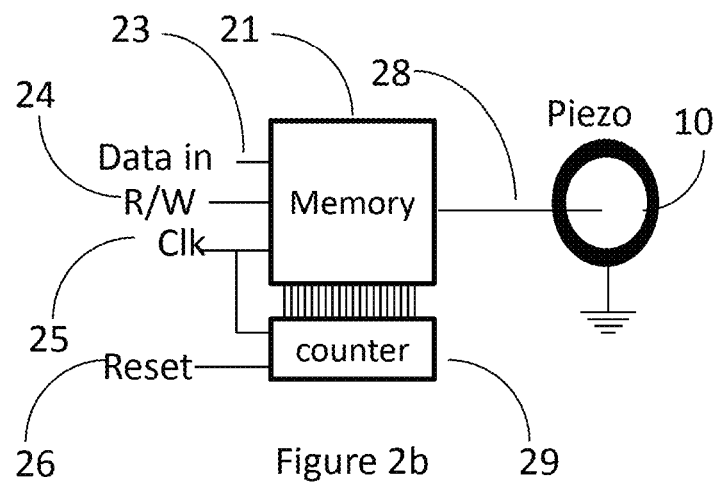

Reference is now made to FIG. 2*b*, which is identical to FIG. 2*a*, except that memory 21 may use a single bit in as its Data In line 23 and a single bit out 28, with no D/A converter 27 prior to piezoelectric speaker 10. In this case, memory 21 may be used to store the dragonfly beats in the form of pulses that may be output from the memory 21 to produce an adequate analog signal for the piezoelectric speaker 10, without D/A conversion, given the speaker's inherent capacitance in series with the appropriate resistance and self inductance, specifically designed to smooth the square wave of the output from the memory.

It is further contemplated that in a finished version of the devices shown in FIGS. 2*a* and 2*b* containing non-volatile memory 21, the respective Data In lines 22 and 23, may be disconnected and the R/W lines 24 may be tied to read-only after writing the dragonfly beats to the memory 21. In fact, memory 21 may correspond to other forms of read-only memories (ROMs) that may be pre-programmed to store the digitized values of dragonfly beats. It is further contemplated that amplifiers may be added on the output of the memory 21 or the D/A converter 27 to amplify the signal to the piezoelectric speaker 10.

Figure 3:
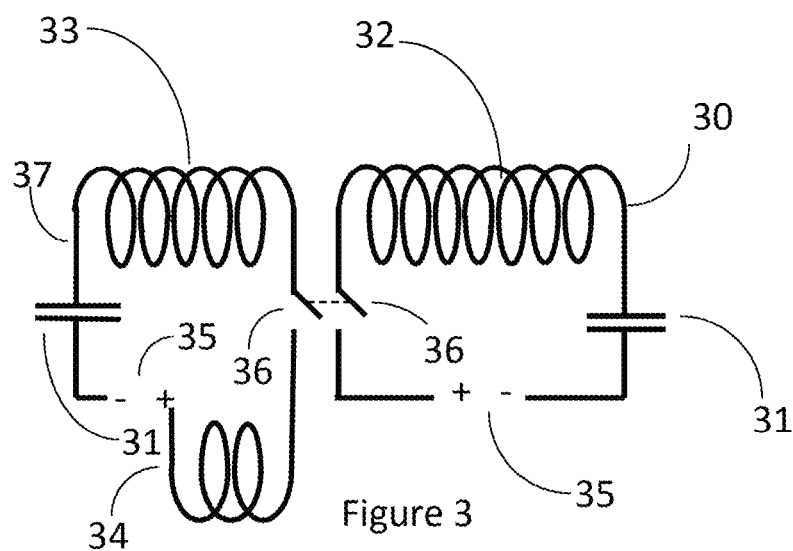
FIG. 3 is a diagram of an example of a device for generating dragonfly wing beat by combining a pair of phase-shifted piezoelectric ring oscillators, where the frequencies of the ring oscillators may be identically set to the wing beat frequency of dragonflies in flight.

Reference is now made to FIG. 3, a diagram of an example of a device for generating dragonfly wing beating beats by combining a pair of phase-shifted piezoelectric oscillators 30, 37, where the frequencies of the oscillators are identically set to the wing beating frequency of dragonflies in flight. Both of the oscillators 30, 37, which may be driven by power sources, e.g., batteries 35, may have the same frequency because the two inductors 33 and 34 on the second oscillator 37 may be made equal to the single inductor 32 on the other oscillator 30. Still, the phase may be shifted between the oscillators 30, 37 because the second oscillator 37 may have different initial states for the inductors 34 and 33, when the switches 36 are closed, than the single inductor 32 of the first oscillator 30. Nominally, the frequencies should be approximately 20 Hz-30 Hz, and the phase shift should be approximately 110 degrees. With the appropriate piezoelectric speakers in place of the capacitors 31, the generated sound may be comparable to the beating frequencies of the fore wings and hind wings (or the front and rear pairs of wings) of a dragonfly in level flight.

Figure 4:
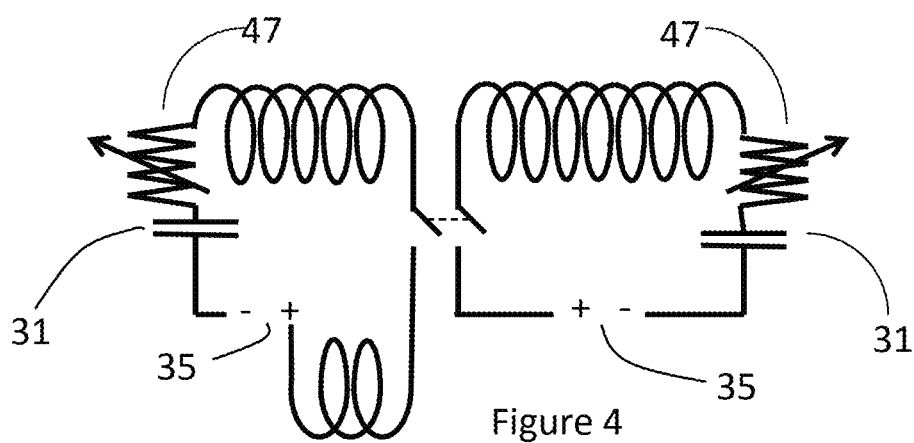
FIG. 4 is a diagram of an example of a device for generating dragonfly wing beat by combining a pair of phase shifted piezoelectric ring oscillators, also including variable resistors that may be used to change the volume of the piezoelectric noise levels.

Reference is now made to FIG. 4, a diagram of an example of a further device for generating dragonfly wing beating beats similar to FIG. 3, with the addition of variable resistors 47 that may be used to change the volume of the piezoelectric noise levels. The volumes of the beats generated by the speakers 31 may be varied by changing the resistance of the variable resistors 47, which may be used to simulate the movement of the dragonfly back and forth in front of the device.

Figure 5A:
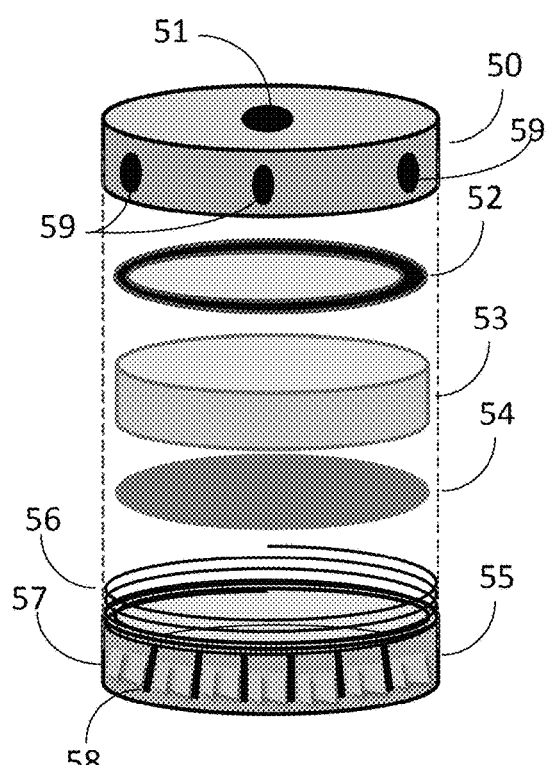
FIGS. 5a-5c are diagrams of the pieces of an example of a device for generating dragonfly wing beats, which may include an on/off button, e.g., on a top cover, a piezo electric speaker, a battery and a bottom cover case.
Figure 5B:
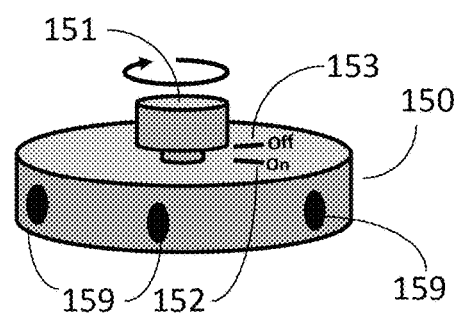
Figure 5D:
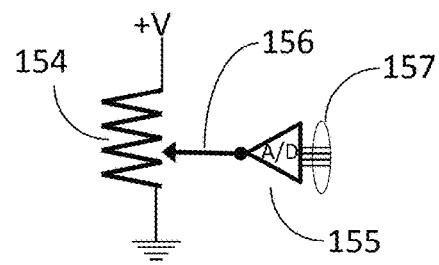
FIG. 5*d* is a diagram of an example of electronics that may be housed within the device for generating dragonfly wing beats.
Figure 5C:
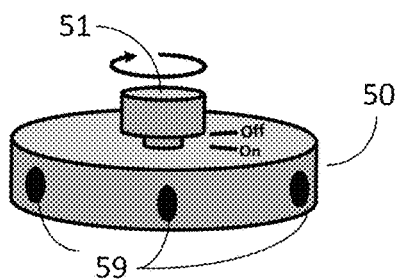

Reference is now made to FIGS. 5a-5c, diagrams of the pieces of an example of a device for generating dragonfly wing beats, and FIG. 5d a diagram of an example of electronics that may be housed within the device for generating dragonfly wing beats. The device may include an on/off button 51 which may be located, for example, but is not limited to being, on a top cover 50. Alternatively, the top cover 150 may include a dial 151, which may be located, for example, but is not limited to being, on the alternate top cover 150. The dial may be connected 156 either to a potentiometer 154 or to a digital output, which may be read via and A/D converter 155 and the signals 157, by the electronics to vary the number of pairs of frequencies. For example, a number of oscillators shown in FIGS. 3 and 4 may be turned on based on the signals 157 from the A/D converter 155. Alternatively, the signals may be used to adjust the address to the memory 21 in FIG. 2a or 2b to select beats corresponding to the number of desired dragonflies. In addition to the top case 50 or 150, the device may include a piezoelectric speaker 52, a battery 53, a card containing a memory or electrical components (e.g. as shown in one or more of FIGS. 1-4, which show devices that may be considered to be sound generators) 54, and a bottom cover case 55. When combined, the pieces may form a "dragonfly button" that, when turned on by pressing the on/off button 51 or rotating a dial 151 between the ON position 152 and the OFF position 153, may emit through the amplification holes 59 or 159 pressure waves corresponding to one or more flying dragonflies. The device may then emit a nonzero number of dragonfly beats, where the number may be determined by the setting of the dial between the two positions. A stop at the OFF position 153 may correspond to no sound or zero dragonflies. A stop at the ON position may also correspond to no dragonfly sound. It is also contemplated the device may also contain a light-emitting diode (LED) that may indicate whether the device is on or off (e.g., the LED may be on when the device is not in the OFF position 153 and off when the device is in the OFF position 153 if there is a dial on the case 150, otherwise it may be the state of the on/off button 51). The on/off button 51 may include such an LED. If the on/off button 51 is included in the "dragonfly button," it may be lit when the device is off and unlit when the device is on, so that the on/off button 51 may be visible in the darkness, so as to make it easier for a user to activate the device in the dark. Furthermore, if the dial is included in the "dragonfly button," to separately control the LED, when the dial is set to the ON position 152, the device's sound may be off to preserve the battery. As a further alternative, the LED included in the on/off button may always be on or may be controlled by a light sensor so that the LED is always on when the environment is dark and is always off when the environment is sufficiently light to trigger the light sensor (a second LED may be provided in this case, to indicate whether the device is on or off). Furthermore the on/off button may be replaced by pressing on the top cover 50, which may be, for example, spring-loaded, but is not thus limited, to enable the device alternatively to be turned on and off by pressing the top cover 50 down against the bottom cover. This may be performed by pressing notches (not shown) inside the top cover 50 down past hooks 57 that may be disposed on the bottom cover. The spring 56 may provide tension to move the top cover 50 over such that the wires 58 make contact with the notches on the inside of top cover 50 to turn the device on. Pressing down and releasing again may serve to move the notches to the middle of the hooks 57, disconnecting them from the wires 58 to turn the device off.

Figure 7:
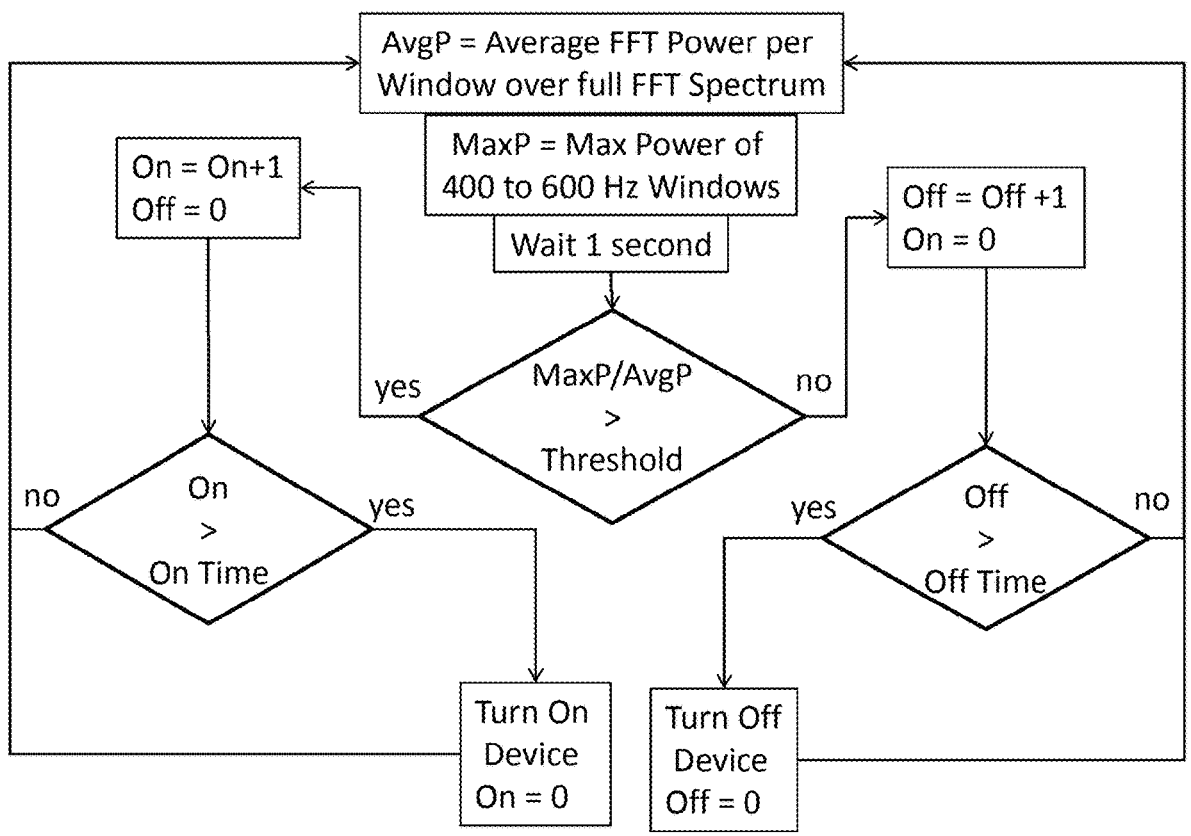
FIG. 7 is an example flowchart of software to turn on or off the device by detecting mosquitoes.
Figure 8:
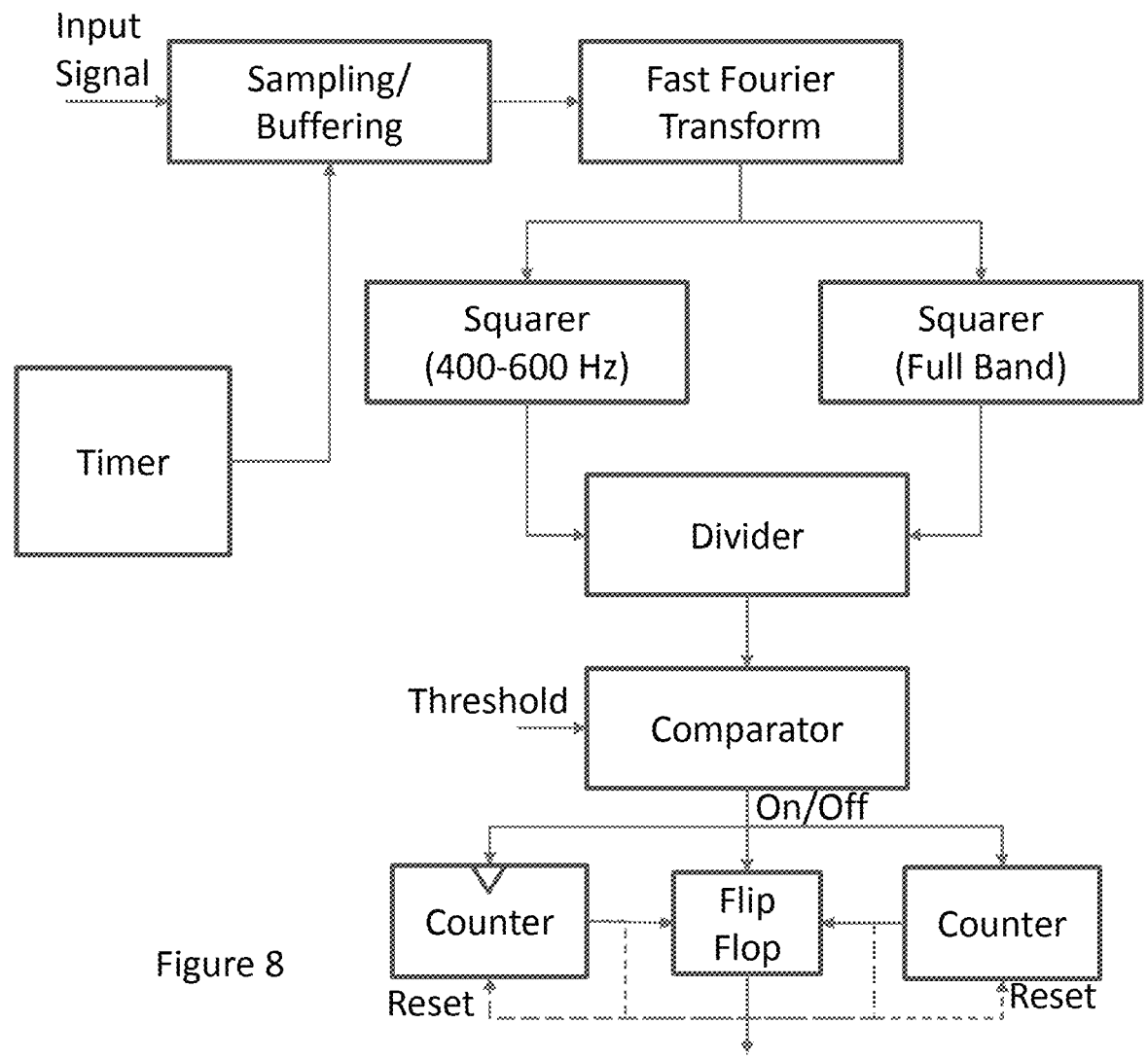
FIG. 8 is an example of a partial block diagram of hardware that may be used to perform at least some of the operations for turning the device on or off by detecting mosquitoes.

According to yet a further aspect of the present disclosure, the on/off switch may be replaced by a microphone and software and/or hardware that may be used to recognize a loud sharp sound, word or whistle to change the device's state from on to off and vice versa. Similarly the microphone and software and/or hardware may be used to recognize the 400-600 Hz frequencies, corresponding to the wing beats of mosquitoes, to turn on the device when one or more of the frequencies is/are present and to turn the device off when no frequencies are present for some predetermined period of time. As shown in FIG. 7, the process may include a positive band Fast Fourier Transform (FFT), which may include an associated windowing to select the 400-600 Hz frequency range (e.g., at least five 50 Hz windows covering the 400-600 Hz range), power computation calculations for each window, and logic (e.g., comparing the ratio of highest power in the associated windows over the average power across the whole FFT band to a predetermined threshold value, e.g., using a comparator or comparison function), specifically looking for significantly higher power anywhere in the 400-600 Hz range compared to the rest of the frequency band. This may be used to turn on the device, e.g., after a predetermined period of time that this higher power is detected, and the device may turn off after another predetermined period of time in which no such frequency-specific high power condition is detected. In FIG. 7, as a non-limiting example, power measurements/comparisons may be performed once per second, and the on-off threshold periods of time may be denoted by "On Time" and "Off Time," which may be compared to count values that may represent a number of times that a ratio of a maximum power (in the range 400-600 Hz) to an average power over the whole FFT band is greater than or not greater than a predetermined threshold ("Threshold"). Note that similar or the same functionality may be embodied as hardware, e.g., as shown in FIG. 8, or in the form of software instructions or firmware instructions that may be executed by one or more processors. In yet another aspect, the microphone may be employed to determine the number of mosquitoes, which may be used to determine the number of dragonfly beats to generate.

Figure 6A:
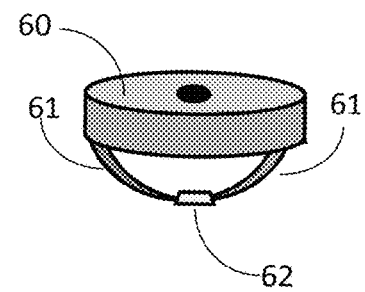
FIGS. 6*a*-6*c* are diagrams of example devices with different methods of attachment to a user's clothing.
Figure 6B:
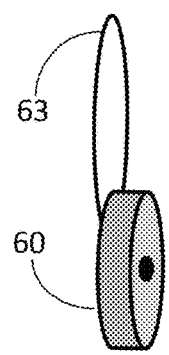
Figure 6C:
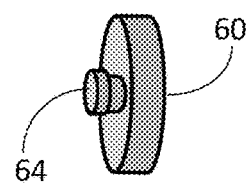
Figure 6D:
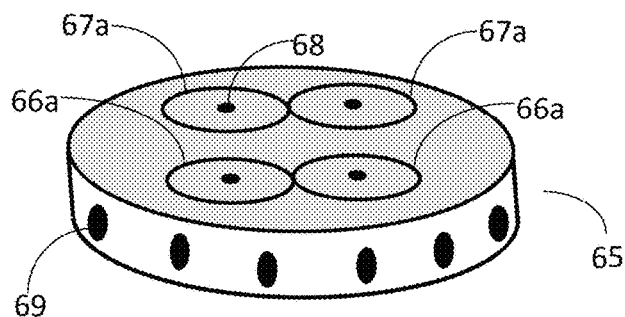
FIG. 6*d* is a diagram of an example of a dragonfly wing button with air holes to issue timed pressure pulses.

Reference is now made to FIG. 6d, which shows a diagram of an example of a dragonfly wing button with air holes to issue timed pressure pulses. Typically, the fore wings and the hind wings beat down in pairs together offset by some time between them. The dragonfly button 65 in FIG. 6d may have two pairs of holes 68, one for the fore wings 66a and the other for the hind wings 67a. Videos of mosquitoes and dragonflies have shown mosquitoes often reacting to the dragonflies only when they are close enough to "feel" the beat of the dragonfly wings. Therefore, in this case, pulses of air that are stronger and sharper than the typical noise alone may be issued from the holes 68 to correspond to the beating of the fore and hind wings. The holes on the side 69 may form intake holes to replenish the air in the button's chamber.

Reference is now made to FIGS. 6a-6c, diagrams of examples of "dragonfly buttons" with different methods of attaching to a user's clothing. In FIG. 6a, straps 61 may be connected to the bottom (or sides) of the dragonfly button 60, for example, but not limited to, with adhesive or Velcro surfaces, to attach directly to articles of clothing. Alternatively, a clasp 62 may attach two straps 61 extending from substantially diametrically opposing sides of dragonfly button 60, which may be fastened, e.g., around a wrist or ankle. In FIG. 6b, a chain, cord or lanyard 63, for example, may be attached to the back of the dragonfly button 60, for securing around, for example, an individual's neck or wrist. Lastly, a knob or similar structure 64 may be attached to the back of the dragonfly button 60, which may fit through a buttonhole and may be used for attaching dragonfly button 60 to a shirt or lapel. It is also contemplated that just the dragonfly button itself 60 may be put in a special pocket or pouch in articles of clothing like hats or scarves to be near the wearer's face or neck, or may be worn in or be fastened to an armband, wristband, legband, or the like.

In another aspect, a low-cost version may be printed on paper as interconnects between thin-film devices, and may be sealed in watertight film. The resulting shape may conveniently slip into pouches in tight-fitting clothing, such as bathing suits or exercise clothes, thereby providing protection where the buttons may be too bulky.

It is further contemplated that multiple dragonfly buttons may be coordinated, either by microphone feedback, or through electrical synchronization, to operate as a stereo signal of a single or multiple dragonflies.

It will be appreciated by persons skilled in the art that the present invention is not limited by what has been particularly shown and described hereinabove. Rather the scope of the present invention includes both combinations and sub-combinations of various features described hereinabove as well as modifications and variations which would occur to persons skilled in the art upon reading the foregoing description and which are not in the prior art.

I claim:

1. A method of repelling mosquitoes, the method including generating signals of one or more pairs of dragonfly fore and hind wings in normal flight, wherein generating the signals includes simulating dragonfly movement toward and away from a location by synthesizing a beating frequency of approximately 20 Hz of, and non-zero phase shifts of approximately 110 degrees between, at least one pair of dragonfly fore and hind wings; and outputting the signals in the form of pressure waves to repel the mosquitoes.

2. The method of claim 1, wherein generating the signals includes synchronizing two or more devices to play pressure waves of one or more dragonflies in stereo.

3. The method of claim 1, wherein outputting the signals comprises synthesizing the pressure waves from the signals using a piezoelectric speaker, and wherein the method further comprises providing an on/off button and a battery, wherein the method is performed within a device including a top and bottom of a case that incorporates the piezoelectric speaker, the on/off button and the battery.

4. The method of claim 1, wherein the method further comprises enabling a user to initiate or cease performance of said generating signals and said outputting the signals by pressing down on a top of a case, and wherein outputting the signals comprises using a piezoelectric speaker to synthesize the pressure waves from the signals, wherein the piezoelectric speaker is incorporated into a device including the case.

5. A mosquito repelling device, including a signal generator configured to generate signals of one or more pairs of dragonfly fore and hind wings in normal flight, wherein generating the signals includes simulating dragonfly movement toward and away from the device by synthesizing a beating frequency of approximately 20 Hz of and non-zero phase shifts of approximately 110 degrees between at least one pair of dragonfly fore and hind wings; and at least one speaker coupled to the signal generator and configured to output the signals in the form of pressure waves to repel mosquitos.

6. The device of claim 5, wherein the signal generator comprises a processor.

7. The device of claim 6, wherein the processor resides in a computer.

8. The device of claim 6, wherein the processor resides in a mobile communication device.

9. The device of claim 5, wherein the signal generator includes at least two oscillators configured to synthesize the beating frequency and phase shifts of pairs of dragonfly fore and hind wings.

10. The device of claim 9, wherein outputs of the at least two oscillators are coupled to the at least one speaker.

11. The device of claim 5, wherein the at least one speaker comprises a piezoelectric oscillating device.

* * * * *